Oct. 21, 1924.  
L. N. BURT ET AL  
1,512,520  
MEANS FOR USE IN MACHINING TWO OPPOSITELY TAPERING SURFACES OF A  
WORK PIECE AND IN SCREW THREADING SUCH SURFACES  
Filed Dec. 4, 1922  3 Sheets-Sheet 1

INVENTORS.  
Leslie Newman Burt  
James Edward Freedom.

Oct. 21, 1924. 1,512,520
L. N. BURT ET AL
MEANS FOR USE IN MACHINING TWO OPPOSITELY TAPERING SURFACES OF A
WORK PIECE AND IN SCREW THREADING SUCH SURFACES
Filed Dec. 4, 1922 3 Sheets-Sheet 2

INVENTORS.
Leslie Newman Burt
James Edward Freedom.

INVENTORS.
Leslie Newman Burt
James Edward Freeborn

Patented Oct. 21, 1924.

1,512,520

UNITED STATES PATENT OFFICE.

LESLIE NEWMAN BURT AND JAMES EDWARD FREEBORN, OF WESTMINSTER, ENGLAND, ASSIGNORS TO THE RICHARDS THREAD MILLING MACHINE COMPANY (1918) LIMITED, OF WESTMINSTER, ENGLAND.

MEANS FOR USE IN MACHINING TWO OPPOSITELY TAPERING SURFACES OF A WORK PIECE AND IN SCREW THREADING SUCH SURFACES.

Application filed December 4, 1922. Serial No. 604,850.

*To all whom it may concern:*

Be it known that we, LESLIE NEWMAN BURT and JAMES EDWARD FREEBORN, subjects of the King of Great Britain and Ireland, both residing at 222 Outer Temple, Strand, in the city of Westminster, England, have invented new and useful Improved Means for use in Machining Two Oppositely Tapering Surfaces of a Work Piece and in Screw Threading Such Surfaces, of which the following is a specification.

This invention relates to improved means for use in boring or turning two oppositely tapering internal or external surfaces of a work-piece and in screw-threading such surfaces; such operations being effected at a single setting of the work-piece with the aid of a single boring or turning tool or a thread-milling hob or a combination tool of the character hereinafter described. The invention embraces, moreover, means for automatically or manually regulating the depth of the screw-threads cut, for permitting angular adjustment of the boring tool about the thread-milling hob without dismounting the latter or reversing the direction of rotation of the work-piece, and for enabling the normal rotative speed of the latter in either direction to be slightly increased or diminished with a view to eliminating the facets which would otherwise be formed upon the screw-threads.

Figure 1:
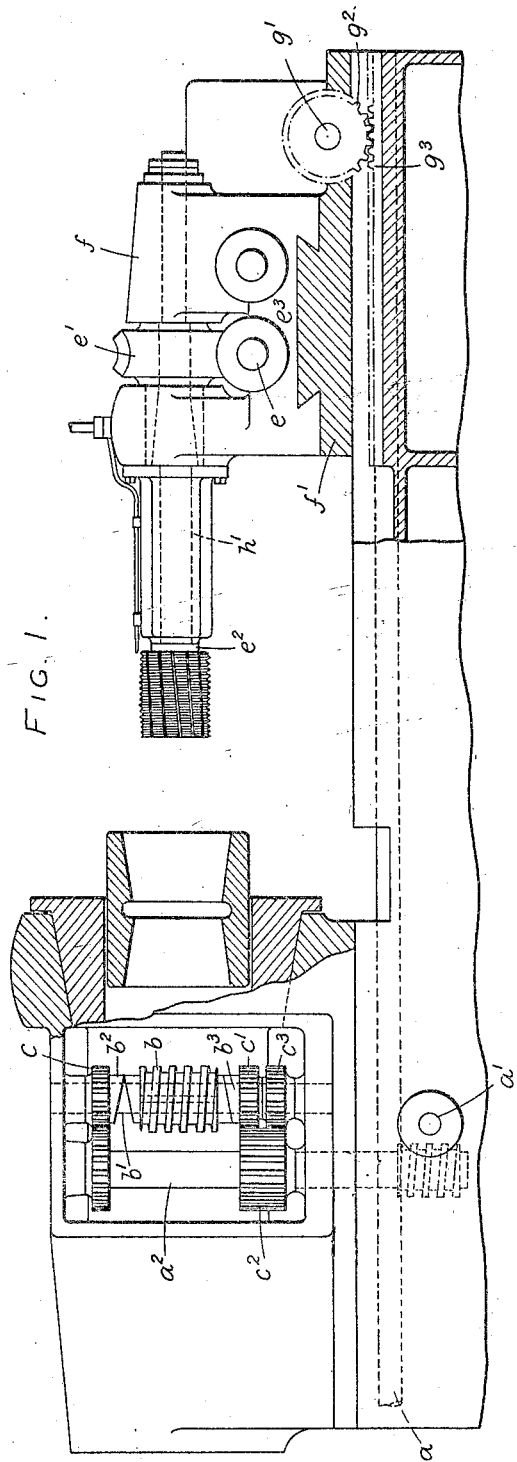
Figure 3:
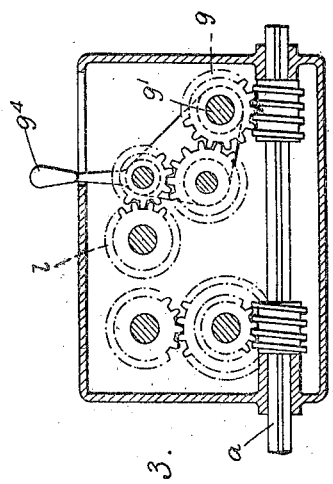
Figure 2:
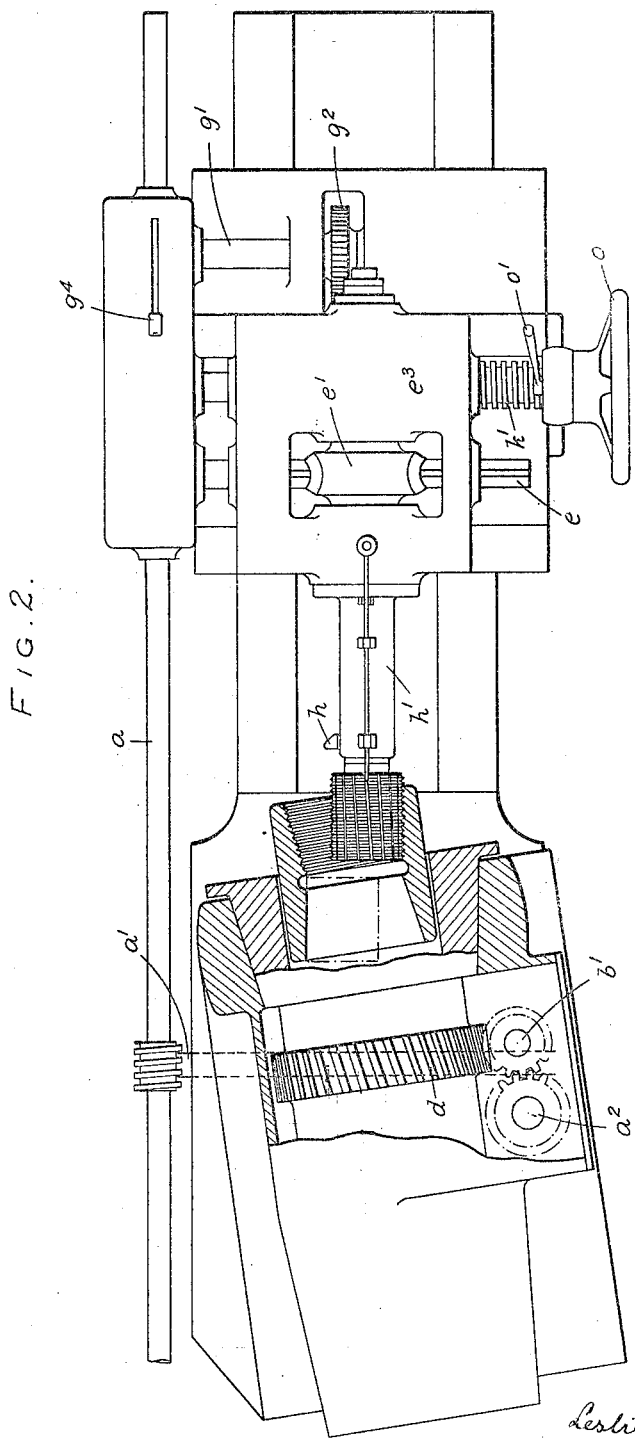
Figure 4:
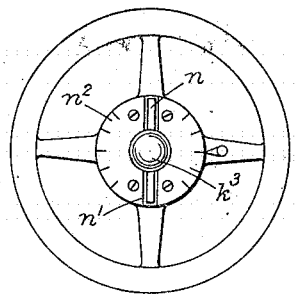
Figure 5:
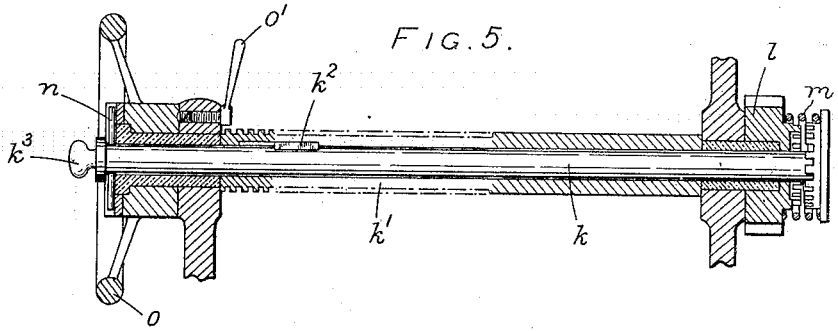
Figure 6:
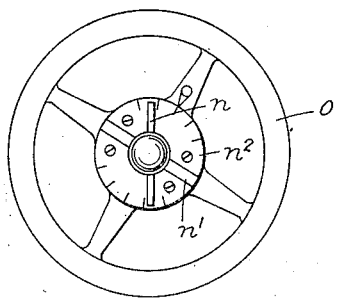
Figure 7:
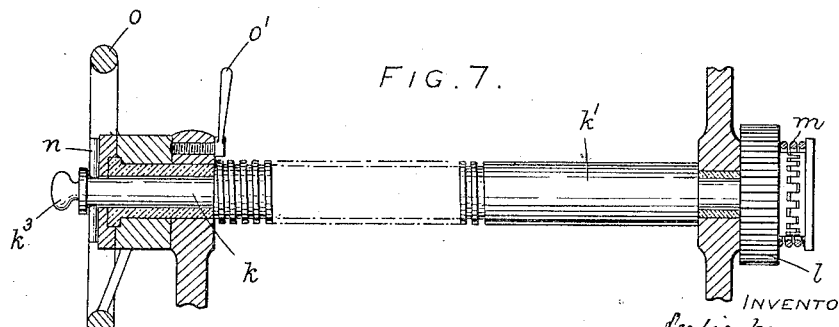

In the accompanying drawings, Fig. 1 is a side elevation, partly in vertical section, illustrating a boring and screw-thread milling machine constructed according to our invention, Fig. 2 a corresponding plan, partly in horizontal section, and Fig. 3 a detail view, in vertical section, showing certain gearing employed. Figs. 4 and 5 are respectively an end elevation and a longitudinal section illustrating in its inoperatve condition manual and automatic mechanism for regulating the depth of the screw-threaded cut, whilst Figs. 6 and 7 are like views, illustrating the operative condition of the said mechanism.

Referring to Figs. 1, 2 and 3, the drive is transmitted from a shaft $a$, by way of the cross-shaft $a^1$ and the vertical shaft $a^2$, through gears $c^2$ and $c^3$ to the shaft $b^1$ which carries a worm $b$; the latter driving a worm-wheel $d$ mounted on the hollow spindle of the headstock. The worm $b$ is feathered upon and rotates with the shaft $b^1$, but is free to slide longitudinally thereon under the influence of the cams $b^2$, $b^3$, carried by the spur-wheels $c$, $c^1$, which are freely mounted upon the shaft $b^1$. Each of the spur-wheels $c$, $c^1$, has one tooth more or one tooth less than the spur-wheel $c^3$, the latter being fast on the shaft $b^1$. Under these conditions, the worm $b$ is driven from the shaft $a^2$ at a speed which is slightly differentiated from that of the cam-faced wheels $c$, $c^1$. The rise and fall of the worm $b$ consequently affects the rotative speed of the worm-wheel $d$ (see Fig. 2), and the rotative speed of the work-piece is alternatively accelerated and retarded in relation to that of the hob, thereby preventing the formation of "facets" in the surfaces of the screw-threads cut.

Rotative motion is also transmitted from the shaft $a$, by way of suitable gearing, to a cross-shaft $e$ and thence, by way of the worm-wheel $e^1$ mounted in the carriage $f$, to the hob-spindle $e^2$. The carriage $f$ is capable of lateral adjustment along V-guides, carried by a saddle $f^1$, and along the cross-shaft $e$, which is furnished with a spline; whilst longitudinal traverse of the carriage and saddle is effected by means of a worm-wheel $g$, driven from the shaft $a$ (see Fig. 3) and mounted upon a cross-shaft $g^1$ carrying a spur-pinion $g^2$ meshing with a rack $g^3$. The worm-wheel $g$ may be disengaged from the cross-shaft $g^1$ by a friction cone and nut—as commonly used on a lathe—operated from the front of the saddle. The lever $g^4$ is primarily intended for use in reversing the direction of feed of the hob-carriage; but when placed in a neutral position, the hob-carriage feed is out of gear.

The headstock carrying the work-piece may be adjusted as regards its angular position, and the machining of the oppositely tapering surfaces is effected by moving the tool diametrically across the interior of the work-piece, the second position of the hob being indicated in broken lines in Fig. 2.

The boring tool $h$ may be brought into the required positions by rotating its stationary carrier $h^1$, which is co-axial with the hob-spindle $e^2$ through an angle of 180°, the hob remaining undisturbed, and thus the boring tool can at will be clamped in position to operate upon the surface to be machined.

The depth to which the thread is to be cut into the work-piece may be set by hand; and for this purpose, we utilize a spindle $k$ (see Figs. 5 and 7) arranged within a hollow-threaded sleeve $k^1$ keyed to the spindle $k$ by means by a spline $k^2$ adapted to permit their relative axial movement to a limited extent. The hollow threaded sleeve $k^1$ engages with a nut attached to the under side of the hob-spindle carriage $e^3$. At one extremity of the spindle $k$, is mounted one member of a clutch, whereof the other member is carried by the spur-wheel $l$ driven from the shaft $g^1$, the clutch members being normally held out of engagement by means of the spring $m$. At the other extremity of the spindle $k$ is a transverse key $n$, adapted to engage in a slot $n^1$ formed in the face of a plate $n^2$ attached to the handwheel $o$; means, such as the clamping lever $o^1$, being provided whereby the handwheel may, when required, be locked against rotation. For manual control, the screw-threaded sleeve $k^1$ is operated from the hand-wheel $o$ by way of the transverse key $n$ and the spline $k^2$.

For automatic operation in producing the full depth of "cut", the knob $k^3$, and hence the spindle $k$, is moved to the position shown in Fig. 7, with the effect that the transverse key $n$ leaves its slot $n^1$, and that the handwheel becomes freed. The handwheel $o$ is then rotated through a suitable angle, the graduation shown in Figs. 4 and 5 assisting in this setting. Upon the sleeve $k^1$ being rotated by the drive through a corresponding angle, the transverse key $n$ re-enters its slot $n^1$, thus rendering the clutch inoperative, cutting out the drive and bringing the handwheel back into engagement.

To compensate for error due to wear, the plate $n^2$ is adjustably mounted with a view to the accurate setting of its graduations in relation to a fixed pointer.

As illustrated in Fig. 3, a suitable gear is also provided for the purpose of feeding the tool in the opposite direction to that above referred to, or for disconnecting the feed-motion of the hob-spindle carriage.

It will be obvious that, by substituting for the hob a boring tool or a suitable milling cutter, the taper surfaces of the work-piece may be bored; and that, without altering the setting of the work-piece in its chuck, the latter may be adjusted co-axial with that of the tool-carrier $h^1$, and the ends of the work-piece faced.

In cutting a single-start thread with a single-start threaded hob, the work-piece and the hob revolve at the same rotative speed; but where a multiple-start threaded hob is employed for cutting a single thread in the work-piece, the rotative speed of the latter has to be increased in proportion to the number of threads employed in the multiple threaded hob.

We claim:—

1. The herein described means for screw-threading two oppositely tapering surfaces of a work-piece at a single setting thereof, such means comprising a hob mounted on a revolving spindle, a chuck adapted to mount the work-piece at an angle oblique to the axis of the hob, means for feeding the hob laterally according to the depth of the cut required, and means for adjusting the hob lengthwise from a position opposite one of the tapering surfaces to a position opposite the other tapering surface, but neither the hob nor the work-piece partaking of any axial movement during the cutting operation.

2. For use in boring two oppositely tapering surfaces of a work-piece at a single setting thereof and with the aid of a single boring tool, the combination, with a revolving tool-carrier of means for moving the latter axially for the purpose of engaging the tool with one or the other of the tapering surfaces, means for moving the tool-carrier laterally for the same purpose and for regulating the depth of cut, and a revolving chuck-carrier capable of angular adjustment in relation to the axis of the tool-carrier.

3. In means for use in screw-threading, boring or turning, two oppositely tapering surfaces of a work-piece, the combination, with a hob-spindle, of a carrier-sleeve whereon a boring or turning tool may be mounted, the carrier-sleeve and the hob-spindle being arranged co-axially and affording one another mutual support.

4. For use in screw-threading, boring or turning, two oppositely tapering surfaces of a work-piece with the aid of a single rotary cutter, the combination, with such cutter, of a carriage wherein the cutter-spindle is mounted, a carriage formed with V-guides or the like adapted to permit lateral travel of the carriage, and means for controlling such movement to regulate the depth of "cut."

5. For use in screw-threading, boring or turning, two oppositely tapering surfaces of a work-piece, a spindle arranged within and keyed to a screw-threaded sleeve, and carrying, as to one extremity, a clutch-controlled spur-wheel, and, as to its other extremity, a transverse key, a handwheel with a graduated plate formed with a slot wherein the transverse key normally lies, and means for clamping the bush of the handwheel when required.

LESLIE NEWMAN BURT.
JAMES EDWARD FREEBORN.